US008711838B1

(12) United States Patent
Guichard et al.

(10) Patent No.: US 8,711,838 B1
(45) Date of Patent: Apr. 29, 2014

(54) USING NETWORK LABELS WITHOUT STANDARD-DEFINED SYNTAX AND SEMANTICS

(75) Inventors: James Guichard, New Boston, NH (US); David Ward, Los Gatos, CA (US); Jan Medved, Pleasanton, CA (US); Maciek Konstantynowicz, Haddenham (GB)

(73) Assignee: Juniper Networks, Inc., Sunnyvale, CA (US)

( * ) Notice: Subject to any disclaimer, the term of this patent is extended or adjusted under 35 U.S.C. 154(b) by 249 days.

(21) Appl. No.: 13/243,310

(22) Filed: Sep. 23, 2011

(51) Int. Cl.
*H04L 12/28* (2006.01)

(52) U.S. Cl.
USPC .......................................... 370/351

(58) Field of Classification Search
USPC .................................. 370/351–430
See application file for complete search history.

(56) References Cited

U.S. PATENT DOCUMENTS

| 7,602,778 | B2 | 10/2009 | Guichard et al. | |
|---|---|---|---|---|
| 7,808,919 | B2 | 10/2010 | Nadeau et al. | |
| 8,094,575 | B1 * | 1/2012 | Vadlakonda et al. | 370/252 |
| 2003/0137978 | A1 | 7/2003 | Kanetake | |
| 2004/0223497 | A1 | 11/2004 | Sanderson et al. | |
| 2005/0220014 | A1 | 10/2005 | DelRegno et al. | |

FOREIGN PATENT DOCUMENTS

WO  2010056582 A2  5/2010

OTHER PUBLICATIONS

Rosen et al. "Multiprotocol Label Switching Architecture" IETF RFC 3031, Network Working Group, Jan. 2001, pp. 62.
Le Faucheur et al. "Multi-Protocol Label Switching (MPLS) Support of Differentiated Services", IETF RFC 3270, Network Working Group, May 2002, pp. 60.
Andersson et al. "LDP Specification", IETF RFC 3036, Network Working Group, Jan. 2001, pp. 124.
Rosen et al. "MPLS Label Stack Encoding" IETF 3032, Network Working Group, Jan. 2001, pp. 24.
Aggarwal et al. "MPLS Upstream Label Assignment and Context-Specific Label Space", IETF 5331, Network Working Group, Aug. 2008, pp. 14.
Beckhaus et al., "LDP Downstream-on-Demand in Seamless MPLS," draft-ietf-mpls-ldp-dod-01, Network Working Group, Internet-Draft, Mar. 12, 2012, 33 pp.

* cited by examiner

*Primary Examiner* — Fan Ng
(74) *Attorney, Agent, or Firm* — Shumaker & Sieffert, P.A.

(57) ABSTRACT

In general, techniques are described for transmitting MPLS labels over a network. More specifically, a network device such a router receives a packet to be forwarded according to a label switching protocol, such as Multi-Protocol Label Switching (MPLS). The router may determine a service instance for the packet based on a client device from which the packet originated. The network device may determine one or more services to apply to the packet based on the service instance for the packet and generate a label which having a service instance portion and a service information portion. The network device may append the label to the packet to form an MPLS-encapsulated packet, and may forward the MPLS-encapsulated packet via an output interface according to the label switching protocol.

24 Claims, 4 Drawing Sheets

USING NETWORK LABELS WITHOUT STANDARD-DEFINED SYNTAX AND SEMANTICS

TECHNICAL FIELD

The techniques of this disclosure relate to computer networks and, more particularly, to routing packets within computing networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Packet-based computer network increasingly utilize label switching protocols for traffic engineering and other purposes. In a label switching network, network devices, often referred to as Label Switching Routers or LSRs, use Multi-Protocol Label Switching (MPLS) signaling protocols to establish Label Switched Paths (LSPs). The LSRs utilize these MPLS protocols to receive MPLS label mappings from downstream LSRs and to advertise MPLS label mappings to upstream LSRs. When an LSR receives an MPLS packet from an upstream router, it switches the MPLS label according to the information in its forwarding table and forwards the packet to the appropriate downstream LSR.

Typically, LSRs at the edge of the MPLS network, referred to as Label Edge Routers (LERs), establish paths through the MPLS network in accordance with the MPLS signaling protocol. LERs may forward signaling messages throughout the network to distribute the appropriate labels in accordance with the MPLS signaling protocol. The LSRs, which typically reside at the core of the MPLS network, along a given path may then update their respective forwarding tables with the appropriate labels. Often LSRs update the forwarding tables to indicate whether to append, swap or remove one of the labels corresponding to a given path.

Upon receiving a unit of data, such as an IP packet, entering the MPLS network, LERs may then inspect the packet, prepend one or more MPLS labels to the packet based on the result of the inspection, and forward the packet via the LSP associated with the label. Upon receiving the labeled packet, downstream LSRs may append an additional label, swap labels or remove the label based on the LSR's forwarding table. The LSR however need not inspect the MPLS packet but may instead base forwarding strictly on the one or more MPLS labels included within a label stack pre-pended to the packet. In this respect, the LSR may perform protocol-independent forwarding and may be used to encapsulate other types of packets. As a result, the LSRs may, by forgoing detailed packet inspection, more efficiently and quickly forward packets throughout the MPLS network.

SUMMARY

In general, techniques are described for applying, transmitting, and receiving flexible, semantic-free, service-identifying MPLS labels within a computer network, such as a Multi-Protocol Label Switching (MPLS) network. The labels, referred to as "doublewide MPLS labels," may include a service instance portion and a service information portion, and may include other portions as well. A user, such as an administrator, may configure a network device, such as a label switched router (LSR), using a programming interface to apply and interpret the doublewide MPLS labels. Once configured, the network device may append, swap, or remove one or more of the labels in the stack. A packet may be for example, an IP packet or any other discrete packet encapsulated within an MPLS packet. Based on the contents of a doublewide MPLS packet within a label stack, a network device, such as a router, may provide one or more services to an MPLS encapsulated packet.

As stated above, a doublewide MPLS label may contain two or more portions. A user, such as an administrator, may configure the number of portions within an MPLS label, and the width in bits of each portion. A portion of an MPLS label, referred to as the service instance portion, may indicate that network devices receiving the labeled packet may apply one or more services to packets, such as traffic logging, content identification, or any other network service or application. Another portion of the same MPLS label, referred to as the service information portion, may indicate information about the one or more services to apply to the packets, such as a particular subscriber associated with a service. Additional portions may be configured to contain data as a particular service or application requires.

To configure how LSRs apply and/or interpret MPLS labels, one or more users may utilize a programming interface, such as an SDK, to define one or more associations between one or more service instance values and one or more services that a network device, such as an LSR, may provide for a packet with a matching service instance value. The user may utilize the programming interface to further define how the network device associates the service information portion of the label with one or more service instance values. The configuration information provided by the programming interface may further specify the width in bits of each portion of a doublewide MPLS label.

In operation, a network device of a label switching network, for instance, a label edge router (LER), sets up one or more label switched paths (LSPs) over which packets, such as IP packets, encapsulated with MPLS labels are transmitted. The LER may setup an LSP according to a protocol, such as Label Distribution Protocol (LDP), or Resource Reservation Protocol-Traffic Engineering (RSVP-TE). Once one or more LSPs have been established the LER may receive one or more packets from one or more client devices. The LER may examine the one or more packets based on stored configuration data, which a user may have set. Based on the configuration data, the LER may apply one or more MPLS labels, which constitute an MPLS label stack, to the packet. The LER may then forward the MPLS encapsulated packet to one or more downstream LSRs over the one or more LSPs.

A network device, such as an LER or an LSR, typically maintains an internal MPLS label space from which one or more of the labels are allocated. The internal MPLS label space may contain associations between the service instance portion of MPLS labels and one or more services the network device may provide for a packet. The network device provides the services only for a packet with a matching service instance portion of an MPLS label. For example, the network device may maintain the association data as well as forwarding data in a forwarding table within a forwarding plane commonly used to bind labels with a next hop along the LSP. The network device may also maintain associations between the service instance portions of labels and the associated service information portions of the labels. The internal MPLS label space may also contain definitions of bit widths and data types for portions of a doublewide MPLS label, as well as a location within the label stack for each defined label. When forwarding MPLS packets, the network device typically accesses one or more of the labels of each of the packets, which may comprise a top-most or outer label of the label stack of the MPLS packets, and either forwards the MPLS packet along the LSP by performing a label swap or extracting the encapsulated packet by popping one or more of the labels.

In operation, a network device of a label switching network, for instance an intermediate LSR along an LSP, may receive an MPLS packet being forwarded along the path via a network link from another network device, such as an LER or another LSR. The MPLS packet may comprise a label stack having one or more labels, which include a service instance portion and a service information portion associated with the service instance portion. As with the LER above, an LSR may maintain an internal MPLS label space containing forwarding data, service instance data, and associated service information data, as well as a scope for the forwarding data, as well as the service instance and information portions. The network device may maintain associations among one or more service instance portions of MPLS labels, and one or more services the network device may provide for the received MPLS packet.

When forwarding doublewide MPLS packets, the network device may access one or more of the labels of each of the packets, which may comprise a top-most or outer label of the label stack of the MPLS packets, and may forward the MPLS packet along the LSP by performing a label swap or extracting the encapsulated packet by popping one or more of the labels. Additionally, a user may configure the network device using a programming interface such that when forwarding MPLS packets, the network device retrieves an association between a service instance portion of one or more doublewide MPLS labels and a service to provide for the MPLS encapsulated packet. The user may also configure the network device to associate the data within a service instance portion of a doublewide MPLS packet with the service information from the forwarding table. Based on configuration data, the device may apply the one or more services associated with the service instance of the label. The network device may additionally utilize the associated service information portion of the label in accordance with the services that the network device is providing. For instance, if the network device is monitoring customer activity to perform a billing function, the service information portion may indicate a subscriber using a particular service. The network device may utilize the subscriber information from the service instance portion of the doublewide MPLS label in a number of different ways. As an example, the network device may record some aspect of the subscriber's activity, such as the amount of bandwidth that the customer consumes.

In one embodiment, a method comprises receiving, with a first network device along a label-switched path (LSP) through a network, a Multi-Protocol Label Switching (MPLS) packet from a second network device of the network in accordance with a label switching protocol, wherein the packet includes a label stack affixed to a payload, and wherein the label stack includes one or more MPLS labels and context information associated with at least one of the labels of the label stack and forwarding the packet out an output interface of the first network device in accordance with the one or more MPLS labels of the label stack. The method further comprises, when forwarding the packet, parsing, with the first network device, the packet to determine the context information and recording the forwarding of the packet and the determined context information.

In another embodiment, a network device along a label-switched path (LSP) through a network comprises an interface card that receives a Multi-Protocol Label Switching (MPLS) packet from a second network device of the network in accordance with a label switching protocol, wherein the packet includes a label stack affixed to a payload, and wherein the label stack includes one or more MPLS labels and context information associated with at least one of the labels of the label stack, forwards the packet in accordance with the one or more MPLS labels of the label stack and, when forwarding the packet, parses the packet to determine the context information. The network device further comprises a control unit that records the forwarding of the packet and the determined context information.

In another embodiment, a network system comprises one or more customer networks and a network. The network comprises at least two network devices that each reside at an edge of a network, wherein one of the at least two edge network devices couples to the one or more customer networks and a transit network device positioned between the at least two edge network devices. The transit network device includes an interface card that receives a packet from one of the edge network devices of the network in accordance with a label switching protocol, wherein the packet includes one or more labels and context information associated with at least one of the labels defining a context for the at least one of the labels, and parses the packet to determine the context information and a control unit that presents the determined context information to a user.

In another embodiment, a network system comprises an ingress Label Switching Router (LSR) of a Multi-Protocol Label Switching (MPLS) network, an egress LSR of the MPLS network, and at least one intermediate LSR positioned between the ingress LSR and egress LSR of the MPLS network. The ingress LSR, the egress LSR and the at least one intermediate LSR all lie along a Label Switched Path (LSP) through the MPLS network. The ingress LSR, the egress LSR and the at least one intermediate LSR exchange one or more signaling messages in accordance with a label distribution protocol (LDP) to negotiate establishment of the LSP. The one or more signaling messages each specifies context information to be included within the network stack for at least one of the one or more labels when forwarding MPLS packets along the LSP.

In another embodiment, a computer-readable medium comprises instructions for causing a programmable processor to receive, with a first network device along a label-switched path (LSP) through a network, a Multi-Protocol Label Switching (MPLS) packet from a second network device of the network in accordance with a label switching protocol, wherein the packet includes a label stack affixed to a payload, and wherein the label stack includes one or more MPLS labels and context information associated with at least one of the labels of the label stack, forward the packet out an output interface of the first network device in accordance with the one or more MPLS labels of the label stack, when forwarding the packet, parse, with the first network device, the packet to determine the context information and record the forwarding of the packet and the determined context information.

In another embodiment, a method comprises receiving, with a first ingress network device along a label-switched path (LSP) through a first network, a packet from a second network device of a second network, wherein the packet includes a header and a payload, but does not include a label stack, inspecting, with the first ingress network device, the header and payload of the packet to determine a forwarding equivalence class (FEC), and determining, with the first ingress network device, a label entry within a forwarding table based on the determined FEC, wherein the label entry defines a MultiProtocol Label Switching (MPLS) label and a scope of context information associated with the MPLS label to affix to the packet. The method also comprises determining, with the first ingress network device, context information in accordance with the scope of the context information defined by the label entry, affixing, with the first ingress network device, a label stack to the packet in accordance with an MPLS protocol to generate an MPLS packet, wherein the label stack includes the MPLS label defined by the label entry and the determined context information, and forwarding, with the first ingress network device, the MPLS packet out an output interface of the first ingress network device in accordance with the MPLS label of the label stack.

The details of one or more examples are set forth in the accompanying drawings and the description below. Other features, objects, and advantages will be apparent from the description and drawings, and from the claims.

DETAILED DESCRIPTION

Figure 1:
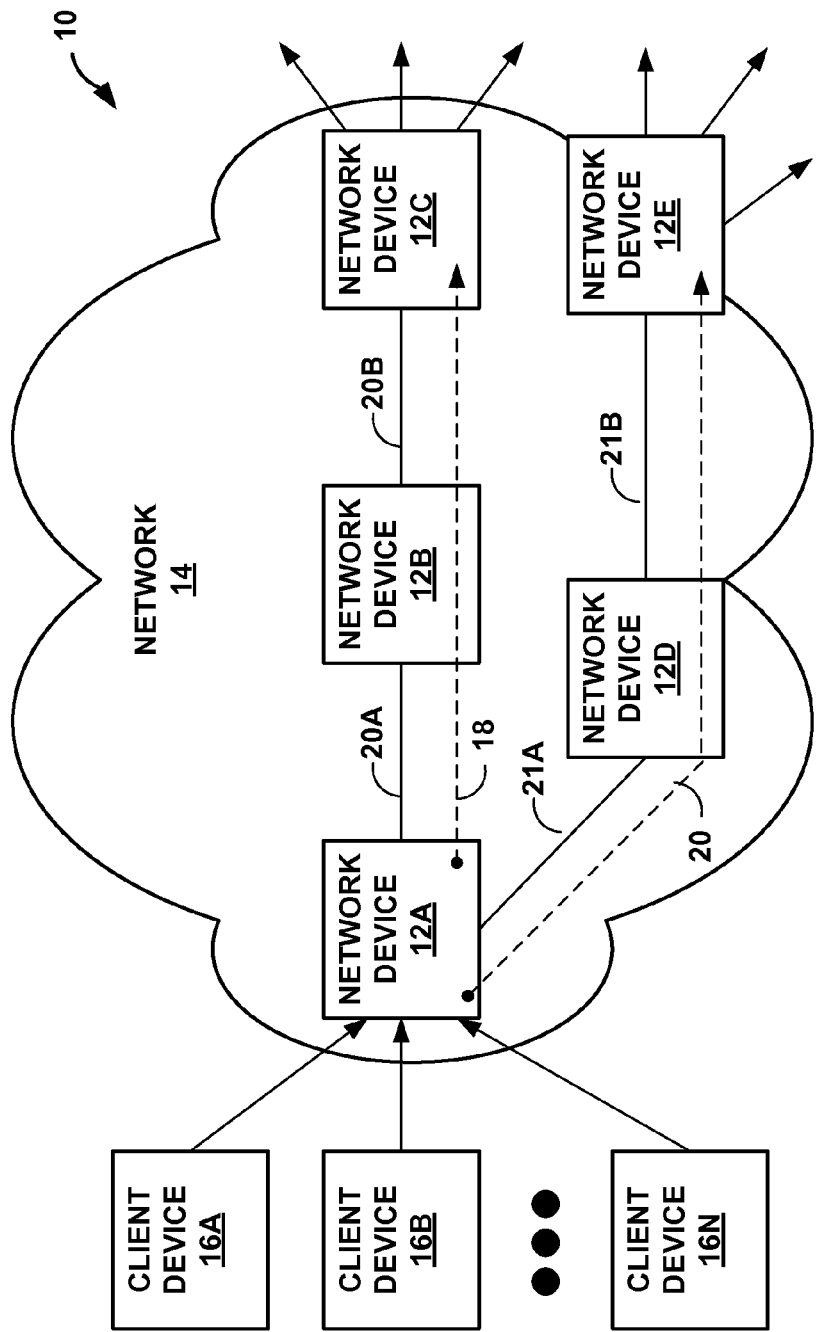
FIG. 1 is a block diagram illustrating a network system in which one or more of network devices performs the label transmission techniques described in this disclosure.

FIG. 1 is a block diagram illustrating a network system 10 in which one or more of network devices 12A-12E perform label transmission according to the techniques described in this disclosure. Network devices 12A-12E ("network devices 12") may each represent a network device, such as a router, that forwards or "switches" packets, such as IP packets, or any other discrete unit of data, via a set path or route through a network, such as network 14, according to one or more labels associated with each packet. That is, an ingress router, such as network device 12A, may append a multiprotocol label switching (MPLS) label stack having a plurality of labels. These labels define routers along a path, typically referred to as a network tunnel, to which an MPLS encapsulated packet is to be forwarded, the path itself, services to be applied to the packet, and other information useful by network devices 12 when tunneling packets through network 14.

Some of the labels in the MPLS stack, sometimes referred to as "doublewide MPLS labels" in this disclosure, have a width that is different than (e.g., twice as wide as) the width conventionally allocated to labels for MPLS. Such labels may, for example, have a width of 40 bits, rather than 20 as conventionally used. Moreover, a doublewide MPLS label may include two or more portions that define a service instance and service information within the corresponding service instance. Rather than having 20 bits allocated to the service instance and 20 bits allocated to the service information, the labels of this disclosure may have any width. Thus, the service instance portion may comprise fewer than, or more than, 20 bits, and the service instance portion may also comprise more or fewer than 20 bits. Thus, these portions may cross a conventional label boundary.

As explained in greater detail below, network device 12A receives configuration data, prior to receiving packets to be tunneled, that defines widths and data for portions of a doublewide service label. The configuration data defines a width of a service instance portion of a service label, as well as service contexts corresponding to possible values of the service instance portion of the service label. Moreover, the configuration data defines a width of a service information portion of the service label, as well as values within the corresponding service context that define one or more services to be applied to packets having the particular value of the service information portion of the label within the service context defined by the service instance portion. Network device 12A may distribute the configuration data, or similar data, throughout network 13 to transmit data that defines labels and information defining network services. In this manner, based on the service information of an MPLS encapsulated packet, network devices 12 provide one or more services to the MPLS encapsulated packet.

Network device 12A acts as an ingress router to network 14, in the example of FIG. 1. Because network device 12A represents an interface between the ingress to a network tunnel through network 14 and devices external to network 14, network device 12A may be referred to as a "Label Edge Router" or LER. Network device 12A receives packets from devices external to network 14, determines tunnels through which to forward the packets, determines next hops along the corresponding tunnel, service instances, and service information for the packets, and appends labels representative of this determined information to the packets. In some examples, network device 12A appends a doublewide service label to a packet including information defining the service instance and service information for the packet, and a transport label identifying a next hop along the tunnel. Collectively, the service label, and the transport label, along with any additional or alternative labels, form an MPLS label stack for the packet.

Other network devices 12 of network 14 may use data of the label stack to determine next hops along the tunnel, the tunnel itself, and services to be applied to the packet. Because the next hop changes for each network device along the tunnel, network devices 12 other than network device 12A may swap the transport label of the MPLS label stack with another label that defines the next hop along the corresponding tunnel. Accordingly, each of network devices 12 may represent and be referred to herein as a "Label Switching Router" or LSR. While described with respect to this particular type of network device 12, any MPLS-enabled network device capable of routing and forwarding packets according to MPLS labels may implement MPLS to facilitate debugging, troubleshooting or other actions within a network system, such as network system 10.

As shown in FIG. 1, network system 10 includes network 14 and client devices 16A-16N ("client devices 16"). Client devices 16 may be computing devices, such as mobile devices, tablets, PDAs, laptop or desktop computers, or any other computing devices. Network 14 may represent a public network that is owned and operated by a service provider to connect with numerous client devices, such as client devices 16. As a result, network 14 may be referred to herein as a Service Provider (SP) network or, alternatively, as a "core network." Example service providers include Verizon Communications Inc. or American Telephone & Telegraph (AT&T) Company.

Client devices 16 may be networks or devices including mobile devices. The devices and networks of client devices 16 may operate according to a wide variety of network protocols, such as any of the 802.3X family of network protocols related to the Ethernet protocol, any of the 802.1X family of wireless networking protocols, Global System for Mobile Communications (GSM), Carrier Division Multiple Access (CDMA), High Speed Packet Access (HSPA), Long Term Evolution (LTE), an Internet Protocol (IP) protocol, an Asynchronous Transfer Mode (ATM) protocol, and a Transmission Control Protocol (TCP). Moreover, in the case where one or more of client devices 16 is a network, the network may comprise a Virtual Private Network (VPN), a Large Area Network (LAN), or a Wide Area Network (WAN). Although not shown in FIG. 1 for ease of illustration purposes, each network may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection.

Network 14 may interconnect the plurality of client devices according to any number of protocols. Commonly, however, a transit network, such as network 14, that interconnects various client devices 16 to one another implements a mechanism or protocol for quickly switching packets, which may comprise packets, or any other discrete unit of data. Often, these transit networks that implement these mechanisms are referred to as a "data-switched network" or "packet-switched network." Multi-Protocol Label Switching (MPLS) refers to one example of a mechanism that network 14 may implement to switch packets via one or more paths through network 14. And according to the techniques of this disclosure, network 14 may also implement MPLS to provide service information on a per-packet basis. For purposes of illustration, it is assumed herein that network 14 implements the MPLS data-carrying and service identification mechanisms and, network 14 may therefore be referred to herein as an "MPLS network." While described below with respect to MPLS, the doublewide label distribution techniques may be utilized by any network device that employs labels to forward packets through a network.

The MPLS data-carrying mechanism of network 10 may be viewed as lying between layer 2 and layer 3 of the Open Systems Interconnection (OSI) model and is often referred to as a layer 2.5 protocol. Network 14 may implement one or more MPLS protocol to negotiate and establish LSPs for encapsulating and forwarding many different types of packets through the network, including IP packets. MPLS may be considered a "protocol" in the sense that it comprises other protocols that network 14 may implement to establish the one or more paths through the network, such as a Label Distribution Protocol (LDP), and manage the path, such as a Resource Reservation Protocol (RSVP) or extensions thereof (e.g., a so-called RSVP Traffic Engineering or RSVP-TE protocol). Further information regarding MPLS and the various features of MPLS, as well as, general architectural information regarding MPLS can be found in Request for Comments (RFC) 3031, titled "Mutiprotocol Label Switching Architecture," prepared by the Network Working Group of the Internet Engineering Task Force (IETF), dated January 2001, incorporated herein by reference.

The techniques described in this disclosure extend MPLS to provide information about OSI layer 4 (referred to as the "transport layer") through layer 7 (referred to as the "application layer") services and applications, as well as subscriber information about those services and applications. That is, the techniques of this disclosure extend MPLS to provide information about higher level OSI model services to network devices, such as network devices 12 of network 10. In order to extend MPLS to provide service information and application, a network, such as network system 10, may utilize larger MPLS labels, each of which may consist of the label spaces of a context label an MPLS label. Utilizing the label spaces of a context label with an MPLS label provides twice the number of bits that may contain service or other information. The new labels, referred to as "doublewide" MPLS labels, have flexible semantics, which allow compatible network devices to divide the new MPLS labels, referred to as "doublewide" MPLS labels into two or more portions.

As stated above, network devices 12 form and utilize doublewide MPLS labels, in accordance with the techniques of this disclosure, where the doublewide MPLS labels include service instance portions and service information portions. The service instance portions generally define a context in which values of the service information portions are interpreted. Thus, the service information portion of a service label may also be referred to as a context portion of the service label. Network devices supporting the use of context portions of service labels, such as network devices 12, read a context value from the context portion of the label in the MPLS label stack.

The value of the context portion of the label may be used to identify a table within the network device in which to look up data for a service information portion of the label following context portion of the label. The context (or service instance) may generally correspond to any or all of a client device from which the packet originated and/or a destination of the packet. Thus, a context portion of a label may assign a specific context to a service information portion of label immediately following the context portion of the label. As an example of how context labels affect an underlying MPLS label, a network device would interpret differently two MPLS encapsulated packets with the same values for service information portions of MPLS labels, but with different context portions of the labels. Further information regarding conventional use of context labels may be found in Request for Comments (RFC) 5331, titled "MPLS Upstream Label Assignment and Context-Specific Label Space," prepared by the Network Working Group of the Internet Engineering Task Force (IETF), dated August 2008, herein incorporated by reference. Rather than having two separate labels, one for context and one for service information within the context, network devices 12 in the techniques of this disclosure utilize a single label having a context (or service instance) portion and a service information portion. The label may be wider than conventional MPLS labels and the portions allocated to service instance and service information may be more or less than the conventional width of MPLS labels.

In addition to doublewide MPLS labels having a greater number of bits compared to ordinary MPLS labels, network devices may interpret doublewide MPLS labels flexibly and free from standard-defined semantics. As an example, a user, such as an administrator, may configure network devices 12 to interpret doublewide labels as having two or more portions. Typically, a doublewide MPLS label is interpreted as having two or more portions, such as a service instance portion and a service information portion. A network device may associate the value of the service instance portion of a doublewide label with a context for interpreting values of the service information portion. The service information portion defines one or more network services or applications network devices 12 apply to the packet encapsulated by the doublewide MPLS label. Some services and/or applications that a network device may provide based on the value of a service instance portion of a doublewide MPLS label includes content caching, or any other information related to a network, service, application, or protocol.

Network devices supporting the use of Doublewide MPLS labels also allow network devices that do not interpret doublewide MPLS labels on the same network, while still allowing the use of doublewide MPLS labels. That is, the use of doublewide MPLS labels may provide for backwards compatibility with conventional network devices that are configured to perform MPLS. To allow a mix of the two types of network devices on the same network, a user, such as a network administrator may configure network devices 12 to interpret the service instance and service information portions as having the same width. Network devices supporting doublewide MPLS labels, in accordance with the techniques of this disclosure, interpret the first portion as the service instance label and the second portion as the service information portion.

As an example of a mixed network of doublewide supporting and non-supporting devices works, network device 12A may support doublewide MPLS labels. Network devices 12A and 12C may support doublewide MPLS labels, whereas network device 12B may not. Network device 12A may apply a doublewide MPLS label with equal service instance and service information portions to a packet of data and forward the MPLS-encapsulated packet to network device 12B. Because network device 12B does not support doublewide MPLS labels, network device 12B may interpret the service information and service information portions of the doublewide MPLS label as a context label and a standard MPLS label, respectively. Network device 12B may be ignorant of the service information associated with the label, and may simply forward the MPLS-encapsulated packet to a next hop, in this example, network device 12C. Network 12C interprets the service instance and service information portions, may apply one or more services to the encapsulated packet, and may forward the packet onto its next hop.

One of the flexible aspects of doublewide MPLS labels is that a user, such as an administrator, may configure and/or reconfigure network devices using a programming interface, such as an application programming interface (API), to change the widths associated with the different portions of doublewide MPLS labels and any associations the portions of the labels may have with contexts and services within those contexts. In this manner, doublewide labels in accordance with the techniques of this disclosure are considered to have no standard-specified syntax or semantics. Instead, the doublewide labels are assigned syntax and semantics after devices implemented to recognize and interpret doublewide labels have been deployed. The administrator may select the width in bits of the service instance portions of MPLS labels based on the number of services that network devices 12 may provide or is expected to provide. To allocate space for a higher number of services, the administrator may configure network devices 12 to allocate a larger number of bits to the service information portions of doublewide MPLS labels and fewer bits to the service instance portions. If the number of services or the amount of service information is lower, the administrator may configure network devices 12 to allocate fewer bits to the service information portions.

An administrator may configure network devices 12 to allocate the size of the service instance portion in a similar manner to the service information portion of a doublewide MPLS label. As stated above, the service instance portion of a doublewide MPLS label may contain subscriber identifiers or other data for identifying a service context. As an example, an administrator may configure how network devices 12 interpret the size of the service instance portion of a doublewide MPLS label depending upon the number of clients and/or servers, or number of service instances that are to be represented within network 14. An administrator may also allocate more bits to the service instance portion of the label if the administrator wants to provide additional room that may be needed later for additional subscribers, but is not currently needed.

As another example of an administrator reconfiguring network devices, the administrator may choose to reconfigure network devices 12 to allocate more bits to the service information portions of doublewide MPLS labels, and fewer bits to the service instance portion of the label if the number of subscribers to one or more services becomes larger, and the amount of label space allocated to the service information portion is insufficient to give each subscriber a unique identifier.

In yet another example, the network administrator may choose to reconfigure network devices 12 to allocate more bits to the service instance portions of doublewide MPLS labels. An administrator may choose to allocate more bits to the service information portion of the labels if the administrator wishes to add additional services to the network, and the number of bits available in the service information portion of the label is insufficient to allocate each service provided a particular service instance value without having duplicates. The administrator may also choose to allocate additional bits to the service information portion so there is additional space available for future services that the administrator may add.

To configure network devices 12, a user, such as an administrator, may use a software development kit (SDK). The SDK may allow the user to compile native code, object code, bytecode, or other programs, which may be executed on a network device with a compatible programming interface, and to provide instructions to network devices 12 via APIs provided by network devices 12. The administrator may create the configuration information on a computing device not connected to and with a different hardware architecture from the network device to be configured. The computing device executes the SDK, allowing the user to develop configuration data for network devices 12. In this manner, the administrator may create the configuration information on the device. The computing device may then provide the configuration data to network devices 12 via the APIs. Additionally or alternatively, one or more of network devices 12 may implement the SDK, and a user may log into the network device, execute the SDK on the network device via a remote device, and cause the network device to distribute the configuration data throughout network 14.

As an example, the administrator may use a desktop computer to compile configuration information for network device 12A using an SDK, such as the Junos or Junos Space SDKs. The SDK may allow the administrator to create configuration information for the one or more network devices using one or more programming languages, such as C, C++, Java, a domain-specific language such as a routing language, or any other programming language.

Once the administrator has created configuration information detailing how one or more of network devices 12 may interpret doublewide MPLS labels, and wishes to upload it to one or more network devices, the administrator may use a variety of techniques to reconfigure the network device. The administrator may initiate a network transfer, such as secure copy protocol (SCP), file transfer protocol (FTP), or another similar network file transfer session, which transmits the administrator's network configuration information to the one or more network devices to be configured. The administrator may also configure the one or more network devices using a command-line interface (CLI), which may be executed locally or remotely.

Rather than configure each of network devices 12 individually, an administrator may configure one network device using a network transfer or command-line interface and rely on network devices 12 to use an extended version of a protocol, such as Label Distribution Protocol (LDP), Resource Reservation Protocol-Traffic Engineering (RSVP-TE), Multi-Protocol Border Gateway Protocol (MP-BGP), or another protocol capable of distributing MPLS label information, to distribute configuration information associated with one or more portions of doublewide MPLS labels over network 10. As an example, an administrator may configure one network device, such as network device 12A using a command-line interface or a network transfer mechanism described above. Network device 12A may utilize a label distribution protocol to establish an LSP for one or more service instances, and transmit the configuration information related to the one or more service instances to other network devices on the same LSP.

In some examples, network devices 12 implement LDP or another protocol, such as MP-BGP, to establish at least one path 18 through network 14. For the purposes of example, only LDP is discussed. A network device may also implement LDP to establish other paths, such as path 20 through network 14. In addition to establishing routes through network 14, network 14 may utilize an extended version of LDP to communicate service information to other network devices on network 14, such as network devices 12B and 12D. That is, devices implementing a protocol may communicate information about one or more level 4 through level 7 services to provide for an MPLS encapsulated packet as well as specific information about those one or more services. Network device 12A may communicate the syntax of the service labels, such as doublewide labels including service instance and service information portions in accordance with the techniques of this disclosure, to one or more upstream or downstream network devices, such as network devices 12 in network 14.

More particularly, network 14 may include the above described plurality of network devices 12 which may, as described above, represent LSRs. Network devices 12A, 12C, and 12E may each reside at an edge of network 14, and as a result may each be referred to herein as a "Label Edge Router" or LER. Typically, LERs, such as network devices 12A, 12C, and 12E establish the one or more paths through network 14 in accordance with a network protocol, such as LDP. Further information regarding LDP, the various services and features of LDP, as well as, general information regarding labels and the applicability of LDP to MPLS can be found in Request for Comments (RFC) 3037, titled "LDP Applicability," prepared by the Network Working Group of the Internet Engineering Task Force (IETF), dated January 2001, herein incorporated by reference.

In the example of FIG. 1, network device 12A establishes a first label switched path 18 through network 14 that flows from network device 12A to network device 12B via link 20A and from network device 12B to network device 12C via link 20B. Network device 12A also establishes a second label switched path that flows from network device 12A to network device 12D via link 21A and from network device 12D to network device 12E via link 21B. Paths, such as paths 18, and 20 typically represent a unidirectional flow of network traffic that is established according to one of the MPLS signaling protocols (for example, LDP). Thus, when network device 12A establishes paths 18 and 20 in accordance with a version of LDP, path 18 may only transmit or carry network traffic from network device 12A to network device 12C but may not transmit or carry network traffic from network device 12C to network device 12A. Similarly, path 20 may only transmit or carry network traffic from network device 12A to network device 12E, but may not transmit or carry network traffic from network device 12E to network device 12A.

Considering this unidirectional flow of network traffic along a given path, for each path, one network device may be referred to as an "ingress network device" while another network device may be referred to as an "egress network device." With respect to path 18, network device 12A may represent the ingress network device and network device 12C may represent the egress network device. With respect to path 20, network device 12A may again represent the ingress network device and network device 12E may represent the egress network device. Network devices 12B and 12D neither act as an ingress point for traffic entering path 18 nor an egress point for traffic leaving path 18, and may be referred to as "transit network devices." When network devices 12B and 12D swap labels, e.g., transport labels, of the MPLS label stack, network devices 12B and 12D may be referred to as "label switching routers," or LSRs.

Network device 12A may establish paths 18 and 20 by first discovering other of network devices 12 that implement LDP. These other network devices 12 may be referred to as "LDP peers." Upon discovering each LDP peer, network device 12A may initiate an LDP session with the discovered one of network devices 12. Network device 12A may then, via the LDP session, negotiate parameters for the LDP session, such as a method by which to exchange labels, including doublewide MPLS labels. After negotiating the parameters, network device 12A and the other one of network devices 12 exchange one or more labels in accordance with the negotiated parameters.

Network device 12A may, for example, establish an LDP session with network device 12B to exchange labels. Network device 12A may, via the established LDP session, advertise bindings between a Forwarding Equivalence Class (FEC) and a label or a portion of a label, such as a service instance portion. A FEC refers to a set of packets that a given network device forwards to the same next hop out of the same interface with the same treatment, such as applying the same service or services applied to the packets. A portion of a doublewide MPLS label may uniquely identify a FEC, and each of network devices 12 may maintain a plurality of FECs. Network device 12A may also receive bindings between FECs and labels from network devices 12B and 12D. Network device 12A may resolve the bindings received from network devices 12B and 12D with those already maintained by network device 12A to resolve paths through network 14. Network devices 12 may each perform this exchange until each of network devices 12 maintains a representation of a topology of network 14.

As an example of how establishing a FEC works with doublewide MPLS labels, an administrator may configure network device 12A, which is an LER in the example of FIG. 1, with doublewide MPLS label configuration information as described above. The configuration information may include data about how many portions are present in one or more doublewide MPLS labels, the width in bits of each portion of the labels, data type information about each portion, one or more services to provide for packets encapsulated with the one or more doublewide MPLS labels, and other information about how to interpret the portions of the labels. Information about how to interpret the portions may instruct network devices on what operations to perform on the various portions of doublewide MPLS labels and what services to provide for packets encapsulated in a doublewide MPLS label stack.

Example operations that a network device may perform on a doublewide MPLS level may include removing a label, adding a label, swapping a label, or performing an operation on a portion of a label. A network device, such as an LSR may remove a label corresponding to one or more services when those one or more services have been completed. An LSR may also remove a label when MPLS-encapsulated traffic is leaving the MPLS-enabled portion of the network.

Network device 12A may utilize a protocol, such as LDP or MP-BGP to establish a first label switched path 18 through network 14 that flows from network device 12A to network device 12B via link 20A and between 12B, and 12C over link 20B. Network device 12A may further establish a FEC with network device 12B, which associates the values one or more portions of one or more doublewide MPLS labels with a next hop, one or more services, and with an interface over which to send the one or more labels. Additionally, network device 12A may send configuration information about MPLS labels to network device 12B via link 20A using an extended form of LDP or MP-BGP. Network device 12B may communicate the same information via link 20B to network device 12C also using a form of LDP or MP-BGP and may also establish a FEC between one or more service instance values, a network interface, and a next hop to network device 12C.

Based on this topology, network devices 12 may resolve the topology to determine the one or more paths through network 14 by which to forward packets associated with each FEC. In some instances, these bindings may be referred to as a binding or association between a label or portion of a label and a next hop, as the FEC may be used to determine the next hop along a given path and one or more services to apply to MPLS-encapsulated packets associated with the FEC. Based on these bindings, each path through network 14 may be associated with one or more, and often, a plurality of labels, identifying each subsequent next hop along the path and the services to provide for packets associated with each FEC. Network device 12A may also reserve bandwidth or other resources via the managing aspect or protocol of MPLS, e.g., RSVP. By using the managing aspect of various protocols, network devices 12A may also ensure a particular quality, level or class of service for a given path. For example, network device 12A may reserve 50 mega-bits per second (Mbps) of bandwidth for path 18 and/or path 20 in accordance with RSVP.

After establishing path 18 in accordance with MPLS, network device 12A may receive a packet from one of client devices 16. Upon receiving the packet, network device 12A may determine to which FEC the packet belongs by inspecting the packet and, based on the FEC, append an MPLS stack, including a corresponding doublewide MPLS label, to the packet. Network device 12A may push a plurality of labels onto the label stack. Network device 12A may then route the packet along a given path, e.g., path 18, through network 14 according to the label.

Assuming network device 12A forwards the packet via path 18, network device 12B receives the packet with the appended label stack. Network device 12B may examine the top label, which may comprise a transport label that defines a "next hop," corresponding to network device 12B relative to network device 12A for path 18. Based on stored configuration information, network device 12B interprets one or more portions of a doublewide label of the label stack, and applies one or more services to the MPLS-encapsulated packet based on the doublewide label. Network device 12B may then swap all or a portion of the label with another label or portion of a label that network device 12B associates with path 18, where the swap may comprise removing or popping the original label appended by network device 12A and pushing or appending a new label, or altering one or more portions of a current label. For example, network device 12B may pop the transport label that identifies network device 12B as the next hop, then push a label that identifies network device 12C as the next hop.

After receiving the MPLS-encapsulated packet network device 12B, may also alter one or more portions of one or more labels in the MPLS label stack. Network device 12B may add to, subtract from, or perform another mathematical or Boolean operation, such as an XOR or NAND operation, on one or more portions of one or more doublewide MPLS labels. Network device 12B may alter portions of a label because altering the portions may provide state information about one or more services to a next network device receiving the packet. In an instance where network device 12B is performing a subscriber billing service to the received packet, for example, a portion of a label may indicate the usage of a quantity, such as bandwidth or traffic that a customer has used. Network device 12B may increment a portion of a doublewide MPLS label to indicate to the next network device that the customer associated with the MPLS label has used some additional amount of the resource.

After receiving the packet, network device 12B may forward the packet via link 20B to network device 12C along path 18. Network device 12C may inspect the label, and determine that a label or label portion identifies path 18, which may cause network device 12C to remove the packet from path 18 and forward the packet to its destination. Network device 12C may remove or pop the label from the label stack of the MPLS header, and forward the packet to the destination indicated in the original packet header, such as an IP header, instead of forwarding the packet based on the MPLS header. Network device 12C may then forward the packet to the destination via any one of a number of routes, as indicated in FIG. 1 by the plurality of arrows exiting network device 12C. In this manner, network 14 may implement the MPLS protocol to establish paths and switch packets along the paths according to the labels associated with the paths. In this respect, paths, such as path 18, may be referred to as a Label Switched Path (LSP).

Similar to LSP 18, network 14 may also form other LSPs, such as LSP 20. In forming LSP 20, network devices 12A, 12D, and 12E may discover each other and build a network topology using a protocol, such as LDP, or MP-BGP. LSP 20 flows from network device 12A via link 21A to network device 12D, and then via link 21B to network device 12E. As with link 18, packets flowing over LSP 20 may flow unidirectionally from ingress device 12A to egress device 12E. Network devices 12A, 12D, and 12E may establish one or more FECs over LSP 20 using a protocol, such as LDP, RSVP, or MP-BGP. The labels that network devices 12A, D, and E transmit may differ from labels transmitted over path 18, however. As stated above, a network device may associate a FEC with one or more services, a next hop, and an interface of a network device. Network device 12A may transmit MPLS-encapsulated packets with labels having one set of label portions over with one set of widths over one interface, such as the interface between network device 12A and network device 12B, and another set of label portions with a different set of label widths over another interface, such as the interface between network device 12A and network device 12D.

Network 14 may implement MPLS for a number of reasons. First, MPLS moves path selection and route decisions to the edges of the network, thereby improving forwarding performance in the core of the network. To illustrate, in the example of FIG. 1, only network device 12A, (or LERs) inspect the packet to determine to which FEC the packet belongs and the destination indicated by the original packet, respectively. Transit network devices 12B and 12D, however, forward packets based on the appended label and may forgo further packet inspection. While LERs, such as network devices 12A, 12C and 12E, may establish and terminate paths and therefore act as ingress and egress network devices that perform this inspection prior to admitting packets to and removing packets from paths, transit network devices, such as network device 12B, and 12D, may forgo the inspection and instead forward packets based on the labels regardless of the protocol to which each packet corresponds. As a result, transit network devices, such as network device 12B, may more efficiently forward packets, as network device 12B may forward packets based on labels without having to perform additional inspection of packets.

Second, MPLS networks, such as network 14 may transmit any type of packet or network traffic that corresponds to a number of different protocols, including IP. In this respect, MPLS may not require any protocol-specific hardware architecture in the core of the network and may be considered protocol independent. Thus, service providers may employ MPLS network 14 to service a wide variety of customers that implement a wide variety of network architectures to form customer networks, such as customer networks 16.

Network device 12A may push the determined label into the label stack of the packet and forward the packet with this MPLS header to network device 12B. Network device 12B of network 14 may receive the packet from network device 12A of network 14 via a path 18 established in accordance with LDP or another protocol, as described above. The received packet may include one or more labels each containing two or more portions, such as a service instance portion and a service information portion. The service instance portion may define one or more services to provide for the MPLS encapsulated packet, and the service information portion may indicate something about the one or more services associated with the packet.

Network device 12B may typically examine the service instance and service information portions of the encapsulated packet. Based on the contents of the service instance portion and service information portion, network device 12B may apply one or more services to the packet. Services may include one or more of: traffic logging, subscriber identification, content information, or another network service or application. Network device 12B may swap the top label of the stack with a new label maintained by network device 12B, where the new label is associated with network device 12C as a next hop along path 18. Network devices 12B may then forward the packet according to the new label to network device 12C via path 18. Network device 12C may pop all labels of the MPLS label stack before forwarding the original packet (e.g., the packet as received by ingress network device 12A) to a destination indicated by the packet.

Figure 2:
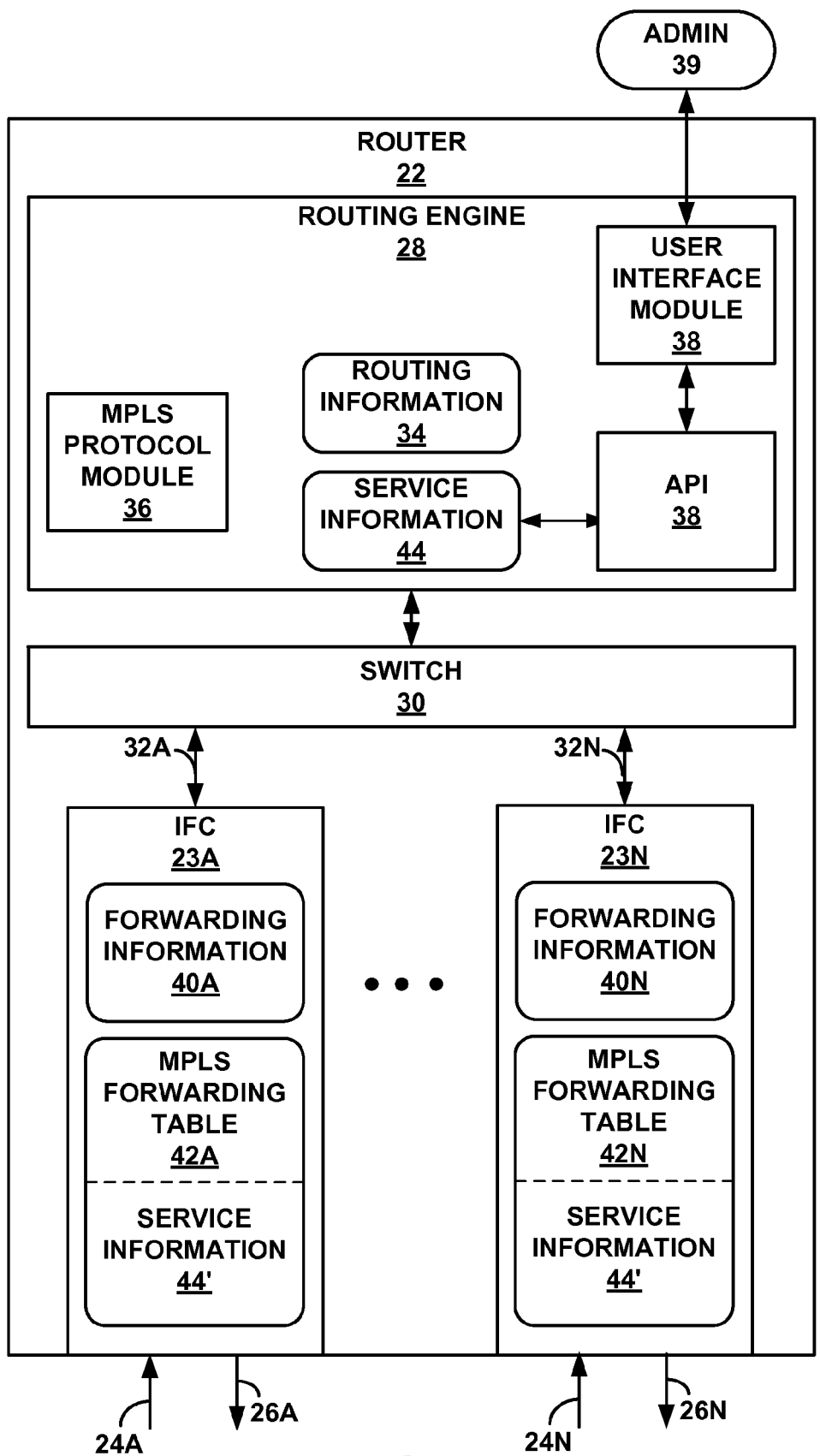
FIG. 2 is a block diagram illustrating an example embodiment of a router that implements the label transmission techniques described herein.

FIG. 2 is a block diagram illustrating an example embodiment of a router 22 that implements the doublewide MPLS label transmission techniques described herein. Router 22 may represent a transit network device similar to network device 12B, however the techniques may be implemented by any network device including ingress and egress network devices, as well as, any other network device that utilizes labels to forward traffic.

In the example of FIG. 2, router 22 includes interface cards 23A-23N (collectively, IFCs 23) that receive and send packets, such as packet flows, via network links 24A-24N and 26A-26N, respectively. Router 22 may include a chassis (not shown) having a number of slots for receiving a set of cards, including IFCs 23. Each card may be inserted into a corresponding slot of the chassis for electrically coupling the card to routing engine 28 via high-speed switch 30 and internal data paths 32A-32N (collectively, internal data paths 32).

Switch 30 also provides an interconnect path between each of IFCs 23. Switch 30 may comprise, for example, switch fabric, switchgear, a configurable network switch or hub, or other high-speed switching mechanisms. Internal data paths 32 may comprise any form of communication paths, such as electrical paths within an integrated circuit, external data busses, optical links, network connections, wireless connections, or other communication paths. IFCs 23 may be coupled to network links 24A-24N and 26A-26N via a number of physical interface ports (not shown). Generally, IFCs 23 may each represent one or more network interfaces by which router 22 may interface with links of a network, such as links 20 of network 14.

In general, routing engine 28 operates as a control unit for router 22. Routing engine 28 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Routing engine 28 may further include computer readable storage medium, such as dynamic memory (for example, Random Access Memory or RAM, dynamic RAM or DRAM, and a cache) and/or static memory (for example, static RAM or SRAM, a Read Only Memory or ROM, and Flash memory), and storage devices, such as Compact Disc ROMs or CDROMs, hard drives, RAM drives, and Digital Video Disc (DVD) drives. In some instances, the computer-readable storage medium may include instructions that cause a programmable processor to perform the techniques described herein.

Routing engine 28 may further include an MPLS protocol module 36 and a user interface (UI) module 38. MPLS protocol module 36 represents a hardware and/or software module that implements the above described signaling and path management protocols, such as the above described LDP, the above described RSVP, the above described MP-BGP, or other protocols. When implemented in software, it is assumed that router 22 includes corresponding hardware for executing the software, such as a processor, and for storing software instructions, such as a computer-readable storage medium. MPLS protocol module 36 may be extended to implement, not only these protocols, but also the doublewide MPLS transmission techniques described herein. User interface module 38 may represent a hardware and/or software module that presents a user interface with which an administrator or other user, such as administrator 39 ("admin 39"), may interact to configure and/or view label context information, as described below in more detail.

Routing engine 28 may further include and maintain routing information 34 that reflects a topology of a network. Router 22 may maintain routing information 34 in the form of one or more tables, databases, link lists, radix trees, databases, flat files, or any other data structure. Based on routing information 34, routing engine 28 generates forwarding information 40A-40N ("forwarding information 40") for IFCs 23.

Each of the IFCs 23 includes a forwarding component (not shown) that forwards packets in accordance with forwarding information 40 and MPLS forwarding tables 42A-42N ("MPLS forwarding tables 42") generated by routing engine 28. Specifically, the forwarding components of IFCs 23 determine a next hop for each inbound packet based on forwarding information 40, identify the corresponding one of IFCs 23 associated with the next hop, and relay the packets to the appropriate one of IFCs 30 via switch 30 and corresponding ones of data paths 32.

IFCs 23 may further include and maintain MPLS forwarding tables 42. MPLS forwarding tables 42 correlate labels or portions of labels associated with incoming MPLS packets with next hops. In accordance with the techniques of this disclosure, MPLS forwarding tables 42 may be extended to associate one or more services associated with one or more portions of a doublewide MPLS label. The forwarding table may include definitions for a type and length or set amount of information of each portion of a doublewide MPLS label. That is, each of MPLS forwarding tables 42 may comprise an entry for one or more portions of a label, where each label entry includes one or more fields indicating the number of fields and size of each portion of the label, one or more actions to take with respect to the label, one or more services to provide for the label, and/or a scope or data type and a set length or amount associated with each portion of the label. This aspect of MPLS forwarding table 42 is illustrated in FIG. 2 as service information 44' to denote that this service information is a derivative of service information 44.

In one example, routing engine 28 may maintain master copies of MPLS forwarding tables 42 and may distribute copies of these tables to each of IFCs 23. Routing engine 28 may add, remove, or modify entries to MPLS forwarding tables 42 and may distribute updated copies to IFCs 23. In another example, routing engine 28 may parse the information in MPLS forwarding tables 42 and send only that forwarding information needed by each of IFCs 23 based on the interfaces associated with each of IFCs 23.

According to the label distribution techniques, e.g., of LDP, router 22 may resolve paths through a network, such as network 14, to which router 22 belongs. To resolve paths, routing engine 28 of router 22 may employ MPLS protocol module 36 to swap or alter routing information 34 with other peer network devices. In the case of LDP, MPLS protocol module 36 may establish one or more LDP sessions with LDP peers to exchange routing information 34. Routing information 34 may therefore include the label space utilized by routing engine 28 in routing MPLS packets through the network. Routing engine 38 may therefore establish or participate in one or more paths through the network in accordance with the MPLS protocol as implemented by MPLS protocol module 36.

When establishing paths, MPLS protocol module 36 may dynamically negotiate or otherwise specify service information associated with portions of doublewide MPLS labels used in forwarding MPLS packets along a given path to be established. Admin 39 may configure MPLS protocol module 36 with one or more FECS, each with two or more label portions and a type and length or set amount of information to negotiate for each path via interactions with a user interfaces presented by user interface module 38. Alternatively, admin 39 may statically configure a MPLS protocol module, similar to MPLS protocol module 36, of each network device, such as router 22, within a given network to define the type and the length or set amount of service information to transmit with each corresponding label or portion of a label.

While shown as directly interacting with user interface module 38, admin 39 may interact with another intermediate device, such as a provisioning system or device, to facilitate more efficient configuration of network devices. That is, admin 39 may specify either the negotiation parameters to be used in dynamically determining the scope, e.g., the type and length or set amount, of the service information associated with each portion of a label or scope of the service information itself (when statically configured). The provisioning system may then interact with each network devices, such as router 22, on behalf of admin 39 to configure these devices according to the input entered by admin 39 to the provisioning system. In this instance, user interface module 38 may present a user interface by which the provisioning system or any other computing device may interact to input configuration information, such as that discussed above. The user interface may, in these instances, accept as input scripts or other files that define a list of commands to quickly input the configuration. The user interface, in these instances, may comprise a Command Line Interface (CLI), for example.

After establishing the path and possibly negotiating the scope of context information to be associated with labels used along the path, routine engine 28 may update routing information 34 to reflect the path and install within one or more of forwarding information 40 and MPLS forwarding tables 42 the bindings or correlations between labels and next hops for the particular path, as well as, define service information 44' within MPLS forwarding tables 42. Routine engine 28 may continue to resolve paths and update IFCs 23 in this manner, and as a result, routing engine 28 may resolve and install a first and second path, or in other words, a plurality of paths within IFCs 23.

IFCs 23 may, meanwhile, receive packets. As router 22 is assumed for purposes of illustration to represent a transit network device, IFCs 23 may generally receive MPLS packets that correspond to a particular one of the plurality of paths resolved by routing engine 28. IFCs 23 may inspect, for each MPLS packet, a top-most or first label included within the label stack defined by the MPLS header of the MPLS packet. IFC 23A may, for example, upon receiving an MPLS packet via link 23A and inspecting the MPLS packet in this above manner, use the determined top-most label as a key into MPLS forwarding table 42A. IFC 23A may retrieve a label entry based on the top-most label and determine a next hop associated with the label, an action to take (e.g., pop, swap, or push), and the scope of the service information, e.g., a type and length or set amount of context information, based on context information 44'.

IFC 23A may then take the action specified by the corresponding label entry. If the action indicates a swap (as is most likely considering that router 22 is assumed to be a transit network device), IFC 23A may replace swap the top-most label with the label indicated by the action and possibly add, remove and/or update the context information associated with the previous label based on context information 44'. That is, the label entry may indicate that the context information associated with the label needs to be swapped with other context information 44' or that a portion of the context information associated with a label need to be replaced or removed. Alternatively, IFC 23A may swap the label leaving any corresponding context information unaltered.

If the action indicates a pop, IFC 23A may remove the top-most label from the label stack and any context information associated with the label. To remove the context information, IFC 23A may remove the corresponding length or set amount of context information following the top-most label. For example, IFC 23A may determine that the set amount of context information equals eight (8) bytes via the corresponding label entry and remove the subsequent 8 bytes immediately following the top-most label on the label stack. If the action indicates a push, IFC 23A may remove the top-most label of the label stack and any context information associated with the label in a manner similar to that of the pop, only the push action adds the set amount of context information defined by label entry below the associated label in the stack.

After taking the above described action, IFC 23A may forward the MPLS packet to the one of IFCs 23 associated with the next hop, as specified by forwarding information 40A. That is, IFC 23A accesses forwarding information 40A using the next hop as a key to retrieve an entry associated with the next hop. The next hop entry may comprise a label assigned to the next network device along the path associated with the top-most label. The next hop entry may identify one of IFCs 23 that couples to the next hop, and IFC 23A may forward the MPLS packet via switch 30 and data paths 32 to the identified one of IFCs 32, which proceeds to forward the MPLS packet via a corresponding one of outbound links 26.

Admin 39 may further interact with a user interface, either the same user interface described above or a different or second user interface, to view information associated with one or more doublewide MPLS packets. In particular, admin 39 may interact with the user interface to cause routing engine 28 to configure IFCs 23 to begin monitoring the traffic associated with one or more portions of one or more MPLS labels.

Once configured in this manner, IFCs 23 may, upon accessing a particular label entry, determine a type and length of each portion of service information 44' associated with a particular label, as described above. To log this information, IFCs 23 may each access the label portions associated with one or more labels in the label stack of each MPLS header as defined by each corresponding label entry in MPLS forwarding table 42A (e.g., as defined by context information 44'). IFCs 23 may copy, parse, or otherwise determine this service information according to the corresponding scopes of the service information and forward this service information to routing engine 28. Routine engine 28 may maintain this logged service information as service information 44. Service information 44 may include an entry for each label that identifies a type and scope of the context information as well as the actual service information extracted by IFCs 23.

User interface module 38 may access context information 44 to retrieve one or more entries of context information 44. Admin 39 either directly or via another computing device, such as a provisioning system, may filter service information 44 by providing criteria by which user interface module 38 retrieves entries of context information 44. For example, admin 39 may indicate that the user interface only present service information corresponding to a particular criteria, such as a particular service. User interface module 38 may then access service information 44 and retrieve only service information 44 that corresponds to the criteria specified by admin 39. Moreover, admin 39 may indicate a particular source address identified by the context information and user interface 39 may only retrieve that context information 44 that indicates the particular value specified by admin 39.

Further, user interface module 38 may perform other operations to facilitate the ease with which admin 39 views and retrieves the data. In this respect, user interface module 39 may pre-process the retrieved portions of context information 44 to present these portions graphically in a chart, table, graph, or other graphical manner via the user interface. As a result, admin 39 may more quickly view and understand context information 44 and possibly better troubleshoot or debug paths, such as path 18, through a network, such as network 10.

Router 22 shown in FIG. 2 is illustrated for the purposes of example. Alternatively, router 22 may have a centralized control unit having a routing engine and a forwarding engine. In this example, forwarding functionality is not distributed to IFCs 23, but centralized within the forwarding engine. However, for ease of illustration, the principles of the techniques of this disclosure are illustrated in the context of router 22.

Figure 3:
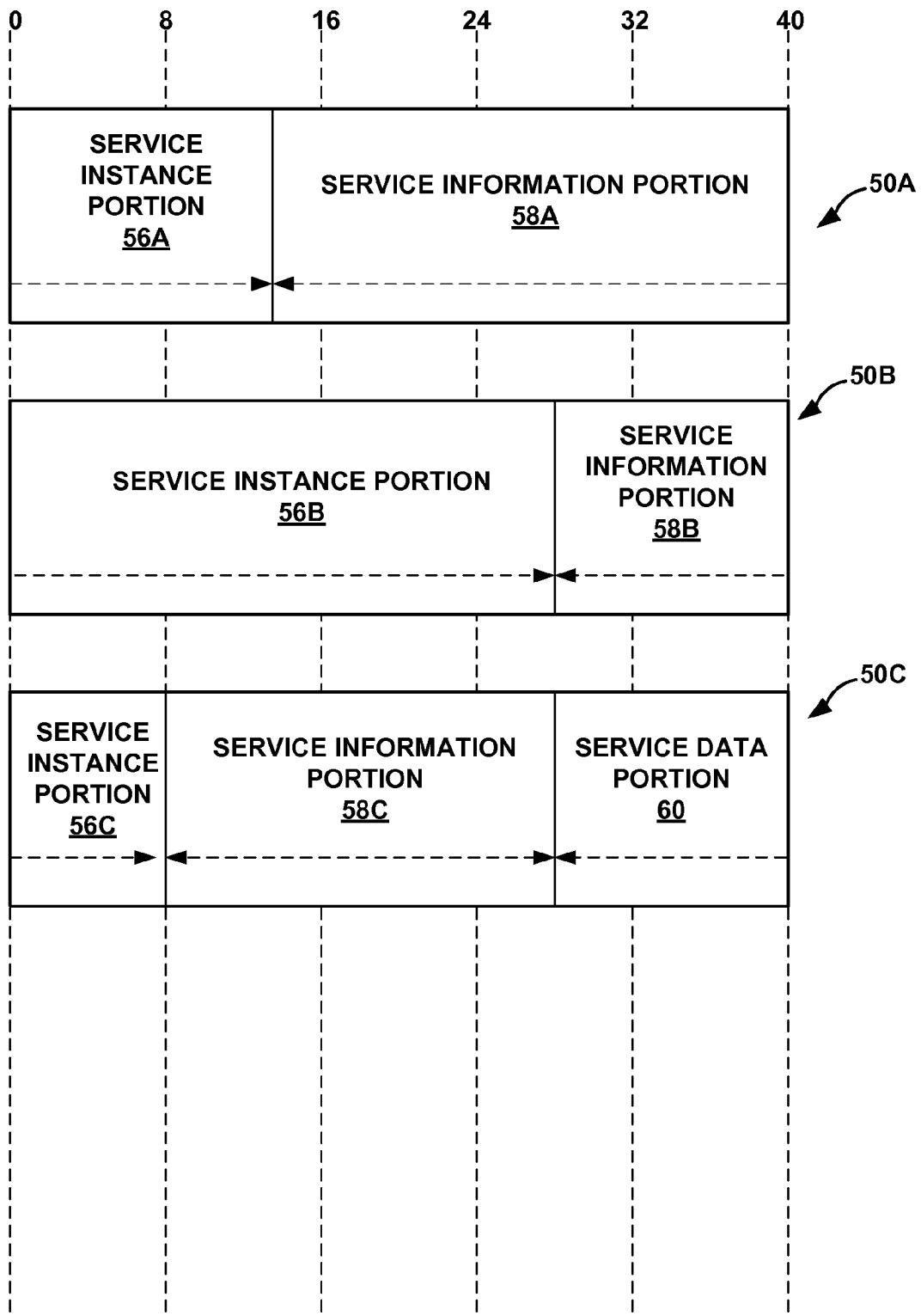
FIG. 3 is a block diagram illustrating an MPLS packet that includes instance and service information portions in accordance with the techniques described in this disclosure.

FIG. 3 is a block diagram illustrating examples of MPLS labels 50A-50C (MPLS labels 50) that include service instance portions 56A-56N, service information portions 58A-58N, and, for MPLS label 50C, service data portion 60, in accordance with the techniques described in this disclosure. MPLS packets including one of labels 50 represent examples of packets generated in accordance with the double-wide MPLS label transmission techniques described herein. Such MPLS packets may include an MPLS label stack including one of MPLS labels 50, as well as other labels such as a transport label. The transport label generally indicates a "next hop" for a corresponding packet. The MPLS label stacks may include additional or alternative labels as well.

As shown in FIG. 3, MPLS labels 50 each include service instance portions 56A-56N ("service instance portions 56") and service information portions 58A-58N ("service information portions 58"). Doublewide labels may also include one or more additional portions, such as a service data portion 60 in the example of label 50C, which is representative of the one or more additional portions that may be present in a label. The examples of labels 50 represent labels having 40 bits of information. Each of labels 50 may additionally include data as specified by MPLS, such as a 3-bit field identifying a Quality of Service (QoS) priority, a 1-bit bottom of stack flag and an 8-bit Time-To-Live (TTL) field. These fields are not shown in FIG. 3 for ease of illustration and explanation.

As stated previously, the service instance portions, such as service instance portions 56, of the labels may identify one or more service instances associated with the label. The service information portion, such as service information portions 58, may identify information related to the one or more services associated with the service instance portion of the label. The 3-bit QoS field indicates a forwarding priority. The 1-bit bottom of stack field indicates whether each label represents the last or bottom label in label stack 50. The 8-bit TTL field indicates an expiration time for the label.

In this example, the width of service instance portion 56A of label 50A is 14 bits. The value of the service instance portion generally defines a context for data of the service information portion. That is, identical values for the service information portions 58 may be mapped to different services for different contexts. In this manner, the data of service instance portions 56 can be considered to define a namespace for values in corresponding service information portions 58. The value of service instance portion 56A is defined according one or more of an originating device of a packet encapsulated by MPLS label 50A (e.g., one of client devices 16 in FIG. 1) and/or a destination device (e.g., a server device).

Service information portion 58A, which is 26 bits in width for the example of label 50A, indicates information about a service to be applied to the corresponding packet given the context defined by service instance portion 56A, such as a malware detection service, an intrusion detection service, or other services. When one or more of network devices 12 of FIG. 1 receive a packet with a service instance value associated with a particular service, the receiving network device provides the service based on configuration stored in the one or more devices. Alternatively, based on the configuration information stored in the network device, another computing device may also apply the service.

Label 50B may be associated with a different service, such as a subscriber identification service. The value of service instance portion 56B of label 50B, which is 28 bits wide in this example, may indicate a context for data of service information portion 58B of label 50B. A value of service information portion 58B, in the context indicated by service instance portion 56B, may indicate that a subscriber identification service is to be applied to a packet encapsulated by label 50B. Service information portion 58B, which is 12 bits wide in this example, may include an identifier of the subscriber. For example, service information portion 58B may contain a portion of an IP address of a device of a subscriber, or a MAC address of a device of a subscriber. As with label 50A above, one of network devices 12 may provide the subscriber identification service or another computing device may perform the subscriber identification service based upon stored configuration information.

Label 50C may be associated with the same or similar services as label 50A or label 50B or a yet another, different service. As an example, a value of service instance portion 56C of label 50C may define yet another context for service information portion 58C. In that context, the value of service information portion 58C may be associated with a content caching service that a network device, such as one of network devices 12 of FIG. 1, provides for a packet encapsulated by label 50C. The device providing the content caching service may monitor traffic related to data accessible by a particular uniform resource locator (URL), such as HTTP Get or partial Get requests for a resource available at the URL. The value of service data portion 60 of label 50C may be an indicator of how much or how frequently the piece of content specified in service information portion 58N is being accessed. Network devices 12 may monitor the value of service data portion 60 until it meets some criteria, such as a certain number of accesses, or a frequency of accesses per time. When the value of service data portion 60 meets this criteria, the network device receiving the packet, or another computing device, may cache the content associated with the value of service information portion 58C.

Each portion of labels 50 may conform to a distinct information type and length or set amount of information. The numbers ranging from zero to forty above labels 50 indicate the width of each label and the portions of each label. Labels 50 pictured in FIG. 3 are each 40 bits in size. As MPLS conventionally defines a label as having a width of 20 bits, labels 50 of FIG. 3 may be referred to as doublewide labels. However, in accordance with the techniques of this disclosure, MPLS labels may be defined to have any size. Vertical lines dividing label portions indicate how many bits are assigned to each portion.

The arrows pointing to the dividing lines are meant to indicate the fact that the width of each label portion may change if a network device is reconfigured. Each label portion may also have its own data type. For example, label portions may contain portions of IP addresses, MAC addresses, and/or unique content identifiers. The data may be stored in binary coded decimal (BCD), unsigned integer, signed integer, floating point, or another binary format. A user, such as an administrator, may reconfigure network devices 12, and change the widths of label portions of labels 50, as well as the data types associated with the portions of labels 50. Network devices 12 may also negotiate the widths and data types of labels 50 using a protocol, such as MP-BGP, RSVP, or LDP.

After configuring service instance portions 56, service information portions 58, and any other label portions, such as service data portion 60, one or more network devices, such as network devices 12, may push, swap, alter, and/or pop labels 50 or other labels in the MPLS label stack, including the corresponding label portions, as described above. Transit network devices, such as network device 12 of FIG. 1, may perform these push, swap and/or pop actions without inspecting payload data included within an MPLS label stack encapsulated packet. Payload data may comprise an original packet received at an ingress network device, such as network device 12A, from a source network device, such as one of client devices 16. Without altering or otherwise editing the payload data, the ingress network device may inspect the payload data and push one of labels 50 onto a label stack, thereby encapsulating the packet to form an MPLS packet and permitting the MPLS packet to traverse a given path associated with the pushed label, such as path 18. Transit network devices may then forward the MPLS packet along path 18 without inspecting payload data 54 or supporting the protocol to which the payload data corresponds, thereby improving forwarding within the core of the network. In some instances, however, network devices 12 may need to inspect the payload data.

Network devices, such as network device 12B (FIG. 1) and router 22 (FIG. 2), may inspect an MPLS label stack to parse or otherwise determine MPLS label portions, such as service instance portions 56 and service information portions 58. These network devices may then present information about service instance portions 56, service information portion 58, and other portions, such as service data portion 60, that relates to these label portions, networks, and/or customers to a user, such as admin 39. Admin 39 may analyze the performance of services associated with labels 50. Based on the analysis, the admin may reconfigure network devices 12 and change the widths of labels 50, label portions, or services associated with labels 50.

Figure 4:
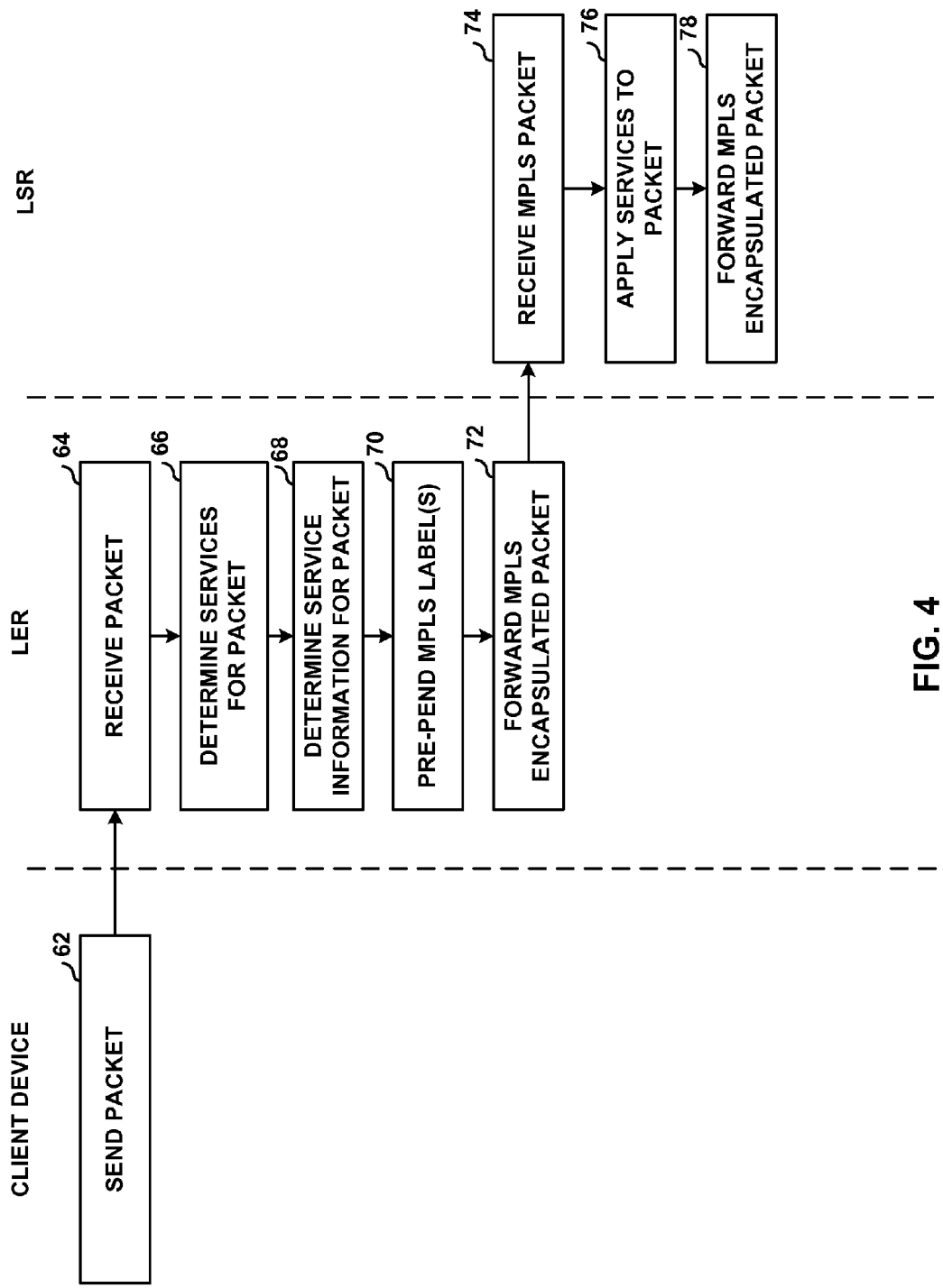
FIG. 4 is a flowchart illustrating operation of a network device in performing the label transmission techniques described herein.

FIG. 4 is a flowchart illustrating operation of a client device, such as client device 16A of FIG. 1, an LER, such as network device 12A of FIG. 1, and an LSR, such as network device 12B of FIG. 1, in accordance with the techniques described in this disclosure. For the purposes of illustration, the LER and LSR are described from the perspective of router 22 from FIG. 2. Initially, one of client devices 16, for instance client device 16A, may send a packet to an LER, such as network device 12A (62). This packet may comprise an IP packet that does not include a label stack.

Network device 12A may receive the packet through one of IFCs 23 of FIG. 2, such as IFC 23A (64). Upon receiving the packet through IFC 23A, router 22 may perform may perform a lookup of the service instance and service information associated with packets received from client device 16A, based on inspecting the received packet, from service information 44' or service information 44. The result of the lookup may contain one or more services for the packet to be applied within a service instance (66). Based on the service instance and one or more services to be provided for the packet, IFC 23A may determine service information for the packet based on information from service information 44' or service information 44 (68). The additional service information may include a subscriber identifier, a portion of a network address, or any other piece of information related to the one or more services being provided for the packet, as well as information identifying services to be applied to the packet within the particular service instance.

IFC 23A may determine to which FEC the packet belongs by inspecting the packet and may perform a lookup of a corresponding one MPLS forwarding tables 42 based on the FEC. IFC 23A may then pre-pend one or more MPLS labels to the packet based on the FEC, the services to provide for the packet, and the service information associated with the one or more services (70). The one or more services to apply to the packet may correlate with a value of a service instance portion of a label, and the service information portion of the label may correlate with value of the service information portion of the label. The values of one or more other label portions may also be based on lookups from service information 44' or service information 44. In this manner, a service label pre-pended to the packet may include a service instance portion defining a context for services to be applied to the packet, as well as a service information portion having a value defining the services to be applied within the context.

IFC 23A may forward the packet having the prepended MPLS label stack, corresponding to an MPLS-encapsulated packet, to network device 12B (72). Network device 12B of network 14 may receive the packet from network device 12A of network 14 via a path 18 established in accordance with LDP, MP-BGP, RSVP, or another protocol, as described above (74). For the purposes of this example, network device 12B is described from the perspective of router 22 of FIG. 2. The received packet may include a doublewide MPLS service label, as discussed above. The doublewide service label may contain two or more portions, such as service instance and service information portions.

Network device 12B may inspect the service instance and service information portions of the one or more labels of the received packet. An IFC, such as IFC 23B, may perform a lookup from service information 44' of IFC 23B of service information 44 based on the service information and/or service information portions of the one or more labels. Based on the results of the lookup, network device 12B may apply one or more services to the received packet (76). In applying one or more services to the packet, network device 12B may apply a service such as traffic logging, content identification, subscriber identification, or another network service or application. Network device 12B may apply the service itself using an IFC, or another computing device may provide the one or more services to the received packet. Depending upon the one or more services to apply to the received packet, network device 12B push, pop, swap, and/or alter any of the one or more MPLS labels.

After applying the one or more services to the packet, IFC 23B may forward the encapsulated MPLS packet to another LSR, or an LER, such as network device 12C (78). Each network device that receives the MPLS-encapsulated packet may perform similar actions of inspecting the packet, applying one or more services, and forwarding the encapsulated packet on to a network device until the packet reaches an LER, which pops off the one or more MPLS packets, and forwards the packet to one or more client devices.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
    receiving, with a network device, a packet to be forwarded according to a label switching protocol;
    determining, with the network device, a service instance for the packet based on a client device from which the packet originated;
    determining, with the network device, one or more services to be applied to the packet based on the service instance for the packet;
    generating a label having a service instance portion including information that identifies the service instance for the packet and a service information portion including information that identifies the services to be applied to the packet, wherein the service instance portion comprises a first number of bits and wherein the service information portion comprises a second number of bits different than the first number of bits;
    prior to generating the label, receiving configuration data that associates a specified number of bits with the label, indicates the first number of bits associated with the service instance portion, and indicates the second number of bits associated with the service information portion;
    appending, with the network device, the label to the packet to form a Multi-Protocol Label Switching (MPLS)-encapsulated packet; and
    forwarding the MPLS-encapsulated packet via an output interface according to the label switching protocol.

2. The method of claim 1, wherein the label has a width of 40 bits.

3. The method of claim 1, further comprising:
recording information associated with one or more subscribers, applications, or services associated with the service instance and associated service information,
presenting, with an interface module of the network device, at least some of the recorded information to a user; and
after presenting the recorded information to the user, receiving the configuration data.

4. The method of claim 1, wherein receiving the packet further comprises receiving the packet from a mobility network, wherein the client device comprises a mobile device of the mobility network.

5. The method of claim 1, further comprising:
recording client access to a content object based upon the service instance and service information of the packet,
wherein the content object comprises one of: an image, a video, a web page, and a file.

6. The method of claim 5, further comprising caching the identified content object.

7. The method of claim 1, further comprising:
distributing information that defines associations between one or more service instances and one or more services to be applied, to one or more downstream network devices,
wherein the information identifies relationships between the service instances and potential values for the service information portion of the label, and
wherein the information further identifies relationships between potential values of the service information, corresponding to a respective service instance, and the services to be applied to packets having a combination of one of the potential values for the service information portion and one of the potential values of the service information.

8. The method of claim 1, wherein appending the label comprises appending the label to cause a downstream device to perform an action based on the value of the label, the action comprising one or more of:
providing content identification, subscriber identification, determining a forward equivalence class (FEC), and logging traffic for data units having at least one of the same service instance labels.

9. The method of claim 8, further comprising:
receiving the configuration data via an application programming interface (API), wherein the configuration data associates a combination of at least one service instance and a piece of service information with an action to be performed on a packet comprising a label having a value for a service instance portion corresponding to the service instance and a value for a service information portion corresponding to the service information.

10. The method of claim 1, wherein a width of the appended label is greater than a width of a label defined by the label switching protocol.

11. The method of claim 1, wherein the client device comprises a first client device, wherein the packet comprises a first packet, wherein the service instance comprises a first service instance, wherein the label comprises a first label, wherein the service instance comprises a first service instance, and wherein the service information comprises first service information, the method further comprising:
receiving a second packet from a second client device different than the first client device;
determining, with the network device, a second service instance for the second packet based on a second client device from which the second packet originated;
determining, with the network device, one or more services to be applied to the second packet based on the second service instance for the second packet;
determining, with the network device, one or more services to be applied to the packet based on the service instance for the packet;
generating a second label having a second service instance portion including information that identifies the second service instance for the second packet and a service information portion including information that identifies the services to be applied to the second packet, wherein the service instance portion comprises a third number of bits and wherein the service information portion comprises a fourth number of bits different than the third number of bits;
appending, with the network device, the second label to the second packet to form a second Multi-Protocol Label Switching (MPLS)-encapsulated packet; and
forwarding the second MPLS-encapsulated packet via a second output interface according to the label switching protocol.

12. A routing device comprising:
a network interface that receives a packet to be forwarded according to a label switching protocol;
a control unit that determines a service instance for the packet based on a client device from which the packet originated, determines one or more services to be applied to the packet based on the service instance for the packet, generates a label having a service instance portion including information that identifies the service instance for the packet and a service information portion including information that identifies the services to be applied to the packet, wherein the service instance portion comprises a first number of bits and wherein the service information portion comprises a second number of bits different than the first number of bits, appends the label to the packet to form a Multi-Protocol Label Switching (MPLS)-encapsulated packet forwards the MPLS-encapsulated packet via an output interface according to the label switching protocol; and
an interface to receive configuration data that associates a specified number of bits with the label, indicates the first number of bits associated with the service instance portion, and indicates the second number of bits associated with the service information portion.

13. The routing device of claim 12, wherein the label has a width of 40 bits.

14. The routing device of claim 12, wherein the control unit is further configured to record information associated with one or more subscribers, applications, or services associated with the service instance and associated service information,
wherein the network device further comprises an interface module configured to present at least some of the recorded information to a user, and after presenting the recorded information to the user, to receive the configuration data.

15. The routing device of claim 12, wherein the network interface configured to receive the packet comprises an interface configured to receive the packet from a mobility network, wherein the client device comprises a mobile device of the mobility network.

16. The routing device of claim 12, wherein the control unit is further configured to:
record client access to a content object based upon the service instance and service identifier of the packet, and
wherein the content object comprises one of an image, a video, a web page, and a file.

17. The routing device of claim 12, wherein the control unit is further configured to cache the identified content object.

18. The routing device of claims 12, the control unit further configured to:
  distribute information that defines associations between one or more service instances and one or more services to be applied, to one or more downstream network devices,
  wherein the information identifies relationships between the service instances and potential values for the service information portion of the label, and wherein the information further identifies relationships between potential values of the service information, corresponding to a respective service instance, and the services to be applied to packets having a combination of one of the potential values for the service information portion and one of the potential values of the service information.

19. The routing device of claim 12, wherein appending the label comprises appending the label to cause a downstream device to perform an action based on the value of the label, the action comprising one or more of:
  providing content identification services, subscriber identification services, determining a forward equivalence class (FEC), and logging traffic for data units having at least one of the same service instance labels.

20. The routing device of claim 19, further comprising:
  at least one interface that receives the configuration data via an application programming interface (API), wherein the configuration data associates a combination of at least one service instance and a piece of service information with an action to be performed on a packet comprising a label having a value for a service instance portion corresponding to the service instance and a value for a service information portion corresponding to the service information.

21. The routing device of claim 12, wherein the client device comprises a first client device, wherein the packet comprises a first packet, wherein the service instance comprises a first service instance, wherein the label comprises a first label, wherein the service instance comprises a first service instance, and wherein the service information comprises first service information, the routing device further comprising:
  a second interface that receives a second packet from a second client device different than the first client device, and wherein the control unit is further configured to determine a second service instance for the second packet based on a second client device from which the second packet originated, determines one or more services to be applied to the second packet based on the second service instance for the second packet, determines one or more services to be applied to the packet based on the service instance for the packet, generate a second label having a second service instance portion including information that identifies the second service instance for the second packet and a service information portion including information that identifies the services to be applied to the second packet, wherein the service instance portion comprises a third number of bits, wherein the third number of bits is different from the first number of bits, and wherein the service information portion comprises a fourth number of bits different than the third number of bits, append the second label to the second packet to form a second Multi-Protocol Label Switching (MPLS)-encapsulated packet, and forward the second MPLS-encapsulated packet via a second output interface according to the label switching protocol.

22. A computer-readable storage medium comprising instructions that, when executed, cause a processor of a routing device of a provider network to:
  receive a packet to be forwarded according to a label switching protocol;
  determine a service instance for the packet based on a client device from which the packet originated;
  determine one or more services to be applied to the packet based on the service instance for the packet;
  generate a label having a service instance portion including information that identifies the service instance for the packet and a service information portion including information that identifies the services to be applied to the packet, wherein the service instance portion comprises a first number of bits and wherein the service information portion comprises a second number of bits different than the first number of bits;
  prior to generating the label, receive configuration data that associates a specified number of bits with the label, indicates the first number of bits associated with the service instance portion, and indicates the second number of bits associated with the service information portion;
  append the label to the packet to form a Multi-Protocol Label Switching (MPLS)-encapsulated packet; and
  forward the MPLS-encapsulated packet via an output interface according to the label switching protocol.

23. A system comprising:
  an ingress routing device configured to receive a packet to be forwarded according to a label switching protocol, determine a service instance for the packet based on a client device from which the packet originated, determines one or more services to be applied to the packet based on the service instance for the packet, generate a label having a service instance portion including information that identifies the service instance for the packet and a service information portion including information that identifies the services to be applied to the packet, wherein the service instance portion comprises a first number of bits and wherein the service information portion comprises a second number of bits different than the first number of bits, prior to generating the label, receive configuration data that associates a specified number of bits with the label, indicates the first number of bits associated with the service instance portion, and indicates the second number of bits associated with the service information portion, append the label to the packet to form a Multi-Protocol Label Switching (MPLS)-encapsulated packet forwards the MPLS-encapsulated packet via an output interface according to the label switching protocol; and
  a second routing device configured to receive the MPLS-encapsulated packet, determine the service instance for the MPLS-encapsulated packet based on the service instance portion of the label, determine at least one of the services to be applied to the MPLS-encapsulated packet based on the service information portion of the label and the service instance, and apply one or more of the determined services to the packet.

24. A method comprising:
  receiving, with a network device, a packet to be forwarded according to a label switching protocol;
  determining, with the network device, a service instance for the packet based on a client device from which the packet originated;

determining, with the network device, one or more services to be applied to the packet based on the service instance for the packet;

generating a label having a service instance portion including information that identifies the service instance for the packet and a service information portion including information that identifies the services to be applied to the packet, wherein the service instance portion comprises a first number of bits and wherein the service information portion comprises a second number of bits different than the first number of bits, and wherein the label has a width of 40 bits;

appending, with the network device, the label to the packet to form a Multi-Protocol Label Switching (MPLS)-encapsulated packet; and forwarding the MPLS-encapsulated packet via an output interface according to the label switching protocol.

* * * * *